7467X
W. Hinds,
Punching and Bending Tires,
Patented Mar. 7, 1833.
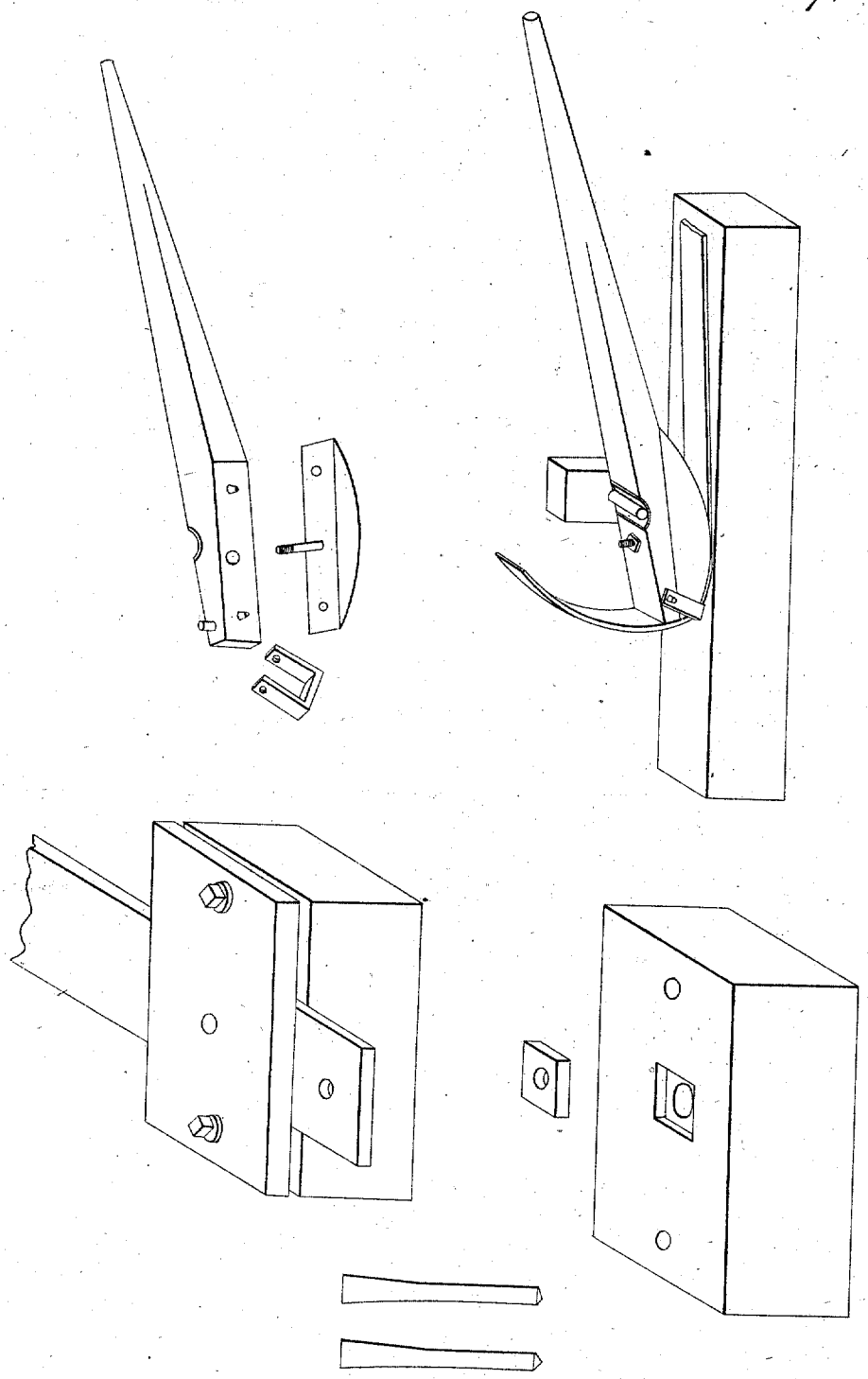
N. PETERS, PHOTO-LITHOGRAPHER, WASHINGTON, D. C.

17467X Mar 7, 1833 [illegible] 15 367

William Hinds Springfield N. Y.
Letters Patent

The schedule referred to in these Letters Patent and making part of the same containing a description in the words of the said William Hinds himself of his improvement in the Machine for punching and bending Wheel hoops or Tires.

To all to whom these presents shall come Be it known that I William Hinds of Springfield in the County of Otsego and State of New York have invented a new and useful machine for punching and bending wheel hoops or tires and that the following is a full and exact description of the construction and operation of said machine as invented or improved by me: The machine is of two parts or principles, one part or principle for punching, the other for bending. The part of the machine for punching is made of iron or other metal two pieces of which [illegible] the base and guide are connected together at the ends by strong screw bolts [illegible] passing perpendicularly through the ends of each and made fast in the base. The base and guide are each from 4 to 8 inches long and from 1½ inch to 5 inches wide with a corresponding hole about one inch in diameter passing perpendicularly through the centre of each. The guide is from half an inch to one and a half inch thick and the base is from 1 to 4 inches deep with a box about 1½ inch square and half inch deep exactly over the hole in the centre of the base for the reception of a die of the same size of the box made of steel or of iron faced with steel through the centre of which is a hole same size of the nail hole to be punched.

For punching wheel hoops or tires or any thick irons 3 or 4 different punches are alternately used in punching each hole. The punches are made of steel from 3 to 5 inches long about 1 inch in diameter, made round and square at the pointed end like the base end of a cylinder except that the points of the punches one of them [illegible] and the other ¼th of an inch in length project out of the square or base end. The punches are made in the old way or fashion like those now in common use. This machine may also be used in [illegible] in punching holes of different sizes in most any thin irons that can [illegible]

74677 into it by having punches of different sizes made on the principle of those above described and dies with holes of different sizes in them to fit into said Machine Machines for punching holes of one size only may be made small of wrought iron by making the hole through the bell the same size of the hole to be punched and facing it with steel instead of letting in a die. The other part of this Machine by which the hoops or tires are bent is a lever into which segments of different circles are attached and detached by means of an iron bolt 16 inches long. The lever is from 5 to 8 feet long, all but 16 inches of which goes to the handle The straight part of the lever which may be called the segment line on which the segments are attached and detached is 16 inches long and from 2 to 4 inches thick. A straight line drawn through on the upper side of the handle intersects the segment line at the end of the lever and with it forms an angle of about 27 degrees. The end of the lever is [illegible] back towards the handle 2 inches in 6 inches from the extremity of the segment line. The lever is about 6½ inches wide at the end and is the same width 16 inches back on the segment line where the iron bolt goes through it. On top of the lever between the corner and the place where the iron bolt goes through it is a curve cut out in a circle whose radius is 12 inches and ironed with thin iron. Round the end of the lever is a stirrup or loop of iron extending far enough below the lever to receive the bars of iron to be bent and is kept in its place by short spikes driven into the lever each side of it. To bend thin iron the stirrup is raised up by putting thin irons under the upper end of it. The segments are made of hard timber 16 inches long same thickness of the lever 2½ inches deep where the bolt goes through them and half [illegible] deep or thick at the end to go under the stirrup with a hole 4 inches from each end to go over short pins in the lever which is also made of hard timber. Owing to the elastic nature of iron segments are made for hind wheels of waggons and carriages &c. 5 inches less and for [illegible] wheels [illegible] inches less in diameter than the diameter of the wheels for which the hoops or tires are to be bent. Another method of making this part of the machine is to make as many different levers as there are segments of different circles, required in the first described lever, which will probably [illegible] and shift the stirrup from one lever to the other instead of shifting segments These levers when made are in the same shape made from that the other lever is [illegible] in when the different segments are
[illegible] attached to it." The lever or levers are operated between a stick of timber
from 4 to 6 feet long 8 by 8 inches square and an iron pin driven horizontally
into a stand 9 or 10 inches above said stick of timber into which the Stand is framed
1 foot from one end. Or the lever or levers may be operated under an iron pin driven
into any convenient post or stud about the shop or elsewhere.

The advantage of this machine
is the punching and bending of iron cold without heating; to do which the iron
should be heated. place the iron into the machine between the base and guide and
[illegible] it by turning the screws. Then place the machine on an anvil and the
punch having the shortest point into the hole in the guide and drive it in the
length of the point with a sledge. Next drive in the other punch [illegible] on the same
principle and the hole will be so far punched and the iron so much broken
that it may be finished with the old fashioned punches lightly driven with a
sledge or hammer. The points of punches should be kept oiled while using them.
To bend the hoops or tires &c place the bar of iron under the iron pin and
place the stirrup over the end of the bar after attaching the proper segment to
the lever if the lever is made on the plan first described and turn it under
the iron pin and it will bend the iron to the circle of the lever [illegible] or [illegible]
segment on the lever. Then ease up and draw the lever back to the straight
part of the bar and slide the bar and lever under the iron pin and turn
the lever as before and so on repeating the same operations until the hoop
or tire is bent. Soft iron with little elasticity in it will be bent too crooked
oftentimes which may be easily straightened to the right circle by placing
the side of a sledge inside the hoop or tire and beating the outside with
a hammer.

The invention of the machine on the different principles
specified and described (except the old fashioned punches to be used in
the same) is claimed Witnesses
John Ayres
Horace Babcock William Hinds Ex.d
Ch.M.

1365 [illegible]

Drawing